US008744663B2

(12) United States Patent
Sato et al.

(10) Patent No.: US 8,744,663 B2
(45) Date of Patent: Jun. 3, 2014

(54) CONTROL APPARATUS FOR AUTONOMOUS OPERATING VEHICLE

(75) Inventors: Kazuhisa Sato, Wako (JP); Makoto Yamamura, Wako (JP); Yoshinori Masubuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 181 days.

(21) Appl. No.: 13/240,684

(22) Filed: Sep. 22, 2011

(65) Prior Publication Data
US 2012/0083961 A1 Apr. 5, 2012

(30) Foreign Application Priority Data

Sep. 30, 2010 (JP) ................................. 2010-222641

(51) Int. Cl.
G01C 22/00 (2006.01)
(52) U.S. Cl.
USPC .................. 701/24; 701/2; 701/36; 701/245; 701/249; 701/258; 701/260
(58) Field of Classification Search
None
See application file for complete search history.

(56) References Cited

U.S. PATENT DOCUMENTS

| 4,815,008 | A | * | 3/1989 | Kadonoff et al. ................ 701/23 |
| 4,852,677 | A | * | 8/1989 | Okazaki .......................... 180/169 |
| 4,890,233 | A | * | 12/1989 | Ando et al. ..................... 701/530 |
| 5,115,238 | A | * | 5/1992 | Shimizu et al. ................. 340/988 |
| 5,151,862 | A | * | 9/1992 | Nakayama et al. ............ 701/501 |
| 5,187,664 | A | * | 2/1993 | Yardley et al. ................... 701/23 |
| 5,251,139 | A | * | 10/1993 | Takano et al. ................. 701/501 |
| 5,278,424 | A | * | 1/1994 | Kagawa ..................... 250/559.37 |
| 5,296,855 | A | * | 3/1994 | Matsuzaki et al. ............. 340/988 |
| 5,307,277 | A | * | 4/1994 | Hirano ........................... 701/472 |
| 5,337,243 | A | * | 8/1994 | Shibata et al. ................. 701/472 |
| 5,367,463 | A | * | 11/1994 | Tsuji .............................. 701/409 |
| 5,528,888 | A | * | 6/1996 | Miyamoto et al. .......... 56/10.2 F |
| 5,689,423 | A | * | 11/1997 | Sawada ........................ 701/454 |
| 5,764,014 | A | * | 6/1998 | Jakeway et al. ............... 318/587 |
| 5,774,073 | A | * | 6/1998 | Maekawa et al. ........ 340/995.21 |
| 5,928,299 | A | * | 7/1999 | Sekine et al. ................... 701/41 |
| 5,938,704 | A | * | 8/1999 | Torii ............................... 701/23 |
| 5,947,225 | A | * | 9/1999 | Kawakami et al. ........... 180/271 |

(Continued)

FOREIGN PATENT DOCUMENTS

| JP | 60-183518 | 9/1985 |
| JP | 60-239812 A | 11/1985 |

(Continued)

OTHER PUBLICATIONS

Decision to Grant A Patent; JP 2010-222641 dated Oct. 29, 2013.

Primary Examiner — Thomas Tarcza
Assistant Examiner — Richard Goldman
(74) Attorney, Agent, or Firm — Arent Fox LLP

(57) ABSTRACT

In an apparatus for controlling an autonomous operating vehicle having an operating machine and a magnetic sensor adapted to detect a border of a travel-scheduled area, the vehicle is controlled to travel around the area from a start point along the border to sequentially record traveling directions and traveled distances on a bitmap. The generated travel trajectory is transformed to map information. A position of the vehicle is detected using bits of the bitmap of the transformed map information, and the vehicle is controlled to, as traveling straight in the north-south directions, while perform the operation with the operating machine based on the calculated traveling direction, the calculated traveled distance and the determined position, utilizing a primary reference direction obtained from a geomagnetic sensor as a reference.

18 Claims, 9 Drawing Sheets

(56) References Cited

U.S. PATENT DOCUMENTS

| | | |
|---|---|---|
| 6,256,560 B1* | 7/2001 | Kim et al. .................. 701/23 |
| 6,272,405 B1* | 8/2001 | Kubota ...................... 701/23 |
| 6,272,406 B2* | 8/2001 | Alofs et al. ................ 701/24 |
| 6,345,217 B1* | 2/2002 | Zeitler et al. .............. 701/23 |
| 6,480,768 B1* | 11/2002 | Torii ......................... 701/23 |
| 6,650,975 B2* | 11/2003 | Ruffner ..................... 701/23 |
| 6,904,343 B2* | 6/2005 | Kang ........................ 701/23 |
| 6,907,336 B2* | 6/2005 | Gray et al. ................. 701/50 |
| 6,963,318 B2* | 11/2005 | Uchiyama .................. 345/30 |
| 6,984,952 B2* | 1/2006 | Peless et al. .............. 318/580 |
| 7,526,362 B2* | 4/2009 | Kim et al. ................ 700/245 |
| 7,974,738 B2* | 7/2011 | Bruemmer et al. ....... 700/255 |
| 7,991,521 B2* | 8/2011 | Stewart ..................... 701/23 |
| 8,224,516 B2* | 7/2012 | Anderson .................. 701/23 |
| 8,392,044 B2* | 3/2013 | Thompson et al. ........ 701/23 |
| 8,396,592 B2* | 3/2013 | Jones et al. .............. 700/253 |
| 2004/0243293 A1* | 12/2004 | Tominaga et al. .......... 701/41 |
| 2005/0096790 A1* | 5/2005 | Tamura et al. ........... 700/245 |
| 2005/0172445 A1* | 8/2005 | Diehl et al. ............... 15/319 |
| 2007/0150109 A1 | 6/2007 | Peless et al. |
| 2012/0083961 A1* | 4/2012 | Sato et al. ................ 701/25 |

FOREIGN PATENT DOCUMENTS

| | | |
|---|---|---|
| JP | 02-057110 | 2/1990 |
| JP | 02-193202 | 7/1990 |
| JP | 02-241422 | 9/1990 |
| JP | 5-85206 | 11/1993 |
| JP | 07-072926 | 3/1995 |
| JP | 08-278817 | 10/1996 |
| JP | 08-286738 A | 11/1996 |
| JP | 3467136 A | 5/1997 |
| JP | 09-319430 | 12/1997 |
| JP | 2007-066086 | 3/2007 |
| JP | 2007-117146 | 5/2007 |
| JP | 2008-027267 | 2/2008 |

* cited by examiner

CONTROL APPARATUS FOR AUTONOMOUS OPERATING VEHICLE

BACKGROUND

1. Technical Field

The invention relates to a control apparatus for an autonomous operating vehicle, particularly to a control apparatus for a vehicle that autonomously travels to perform work or operation, e.g., mow lawn.

2. Background Art

In an autonomous operating vehicle that autonomously travels to perform work or operation such as mowing lawn in a defined operating (travel-scheduled) area, it is necessary to detect a border of the area. Therefore, magnets are embedded on the border and a sensor responsive to the magnets is mounted on the vehicle to detect the border, as taught, for example, by Japanese Laid-Open Patent Application No. Sho 60(1985)-239812 ('812).

Japanese Laid-Open Patent Application No. Hei 8(1996)-286738 ('738) discloses a technique to embed an electric wire along the border and detect generated magnetic field by a sensor mounted on an operating vehicle, thereby detecting the border. Further, Japanese Patent No. 3467136 ('136) proposes a technique to detect a position of an operating vehicle using GPS signals in addition to the foregoing magnetic induction techniques.

SUMMARY

Although the techniques in '812 and '738 enable to detect the border of the travel-scheduled area, it is preferable to additionally detect a position of the operating vehicle in the detected area for improving the work efficiency. Although the GPS signal is used in '136 to deal with it, it makes the structure complicated and may lead to the increase in cost, disadvantageously.

An object of the invention is therefore to overcome the foregoing drawback by providing an apparatus for controlling an autonomous operating vehicle that can detect a position of the vehicle in an operating (travel-scheduled) area with the simple structure.

In order to achieve the object, the invention provides in the first aspect an apparatus for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising: a geomagnetic sensor adapted to produce an output indicative of geomagnetism acting in the travel-scheduled area; an angular velocity sensor adapted to produce an output indicative of angular velocity generated about a vertical axis in center of gravity of the vehicle; a wheel speed sensor adapted to produce an output indicative of a speed of the driven wheel of the vehicle; a direction and distance calculator adapted to calculate a traveling direction based on the output of the angular velocity sensor and a traveled distance based on the output of the wheel speed sensor; a travel trajectory generator adapted to drive the prime mover based on the calculated traveling direction so that the vehicle is traveled around from a predetermined start point along the border of the travel-scheduled area in accordance with the output of the magnetic sensor and during the vehicle's round travel, to sequentially record the calculated traveling directions and the calculated traveled distances on a bitmap, defining the travel-scheduled area and comprising a plurality of divided bits, to generate a travel trajectory with respect to the border of the travel-scheduled area; a map information transformer adapted to transform the generated travel trajectory to map information composed of the bitmap; and a travel and operation controller adapted to determine a position of the vehicle using the bits of the bitmap of the transformed map information, and control the vehicle to, as traveling straight, perform the operation using the operating machine based on the calculated traveling direction, the calculated traveled distance and the determined position, utilizing a primary reference direction obtained from the output of the geomagnetic sensor as a reference.

In order to achieve the object, the invention provides in the second aspect an a method for controlling an autonomous operating vehicle having a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while performing operation using the operating machine, comprising the steps of: obtaining a sensor output indicative of geomagnetism acting in the travel-scheduled area; obtaining a sensor output indicative of angular velocity generated about a vertical axis in center of gravity of the vehicle; obtaining a sensor output indicative of a speed of the driven wheel of the vehicle; calculating a traveling direction based on the sensor output indicative of the angular velocity and a traveled distance based on the sensor output of indicative of the wheel speed; driving the prime mover based on the calculated traveling direction so that the vehicle is traveled around from a predetermined start point along the border of the travel-scheduled area in accordance with the output of the magnetic sensor and during the vehicle's round travel, and sequentially recording the calculated traveling directions and the calculated traveled distances on a bitmap, defining the travel-scheduled area and comprising a plurality of divided bits, to generate a travel trajectory with respect to the border of the travel-scheduled area; transforming the generated travel trajectory to map information composed of the bitmap; and determining a position of the vehicle using the bits of the bitmap of the transformed map information, and controlling the vehicle to, as traveling straight, perform the operation using the operating machine based on the calculated traveling direction, the calculated traveled distance and the determined position, utilizing a primary reference direction obtained from the sensor output of the geomagnetism as a reference.

BRIEF DESCRIPTION OF DRAWINGS

The above and other objects and advantages will be more apparent from the following description and drawings in which.

DESCRIPTION OF EMBODIMENT

A control apparatus for an autonomous operating vehicle according to an embodiment of the invention will now be explained with reference to the attached drawings.

Figure 1:
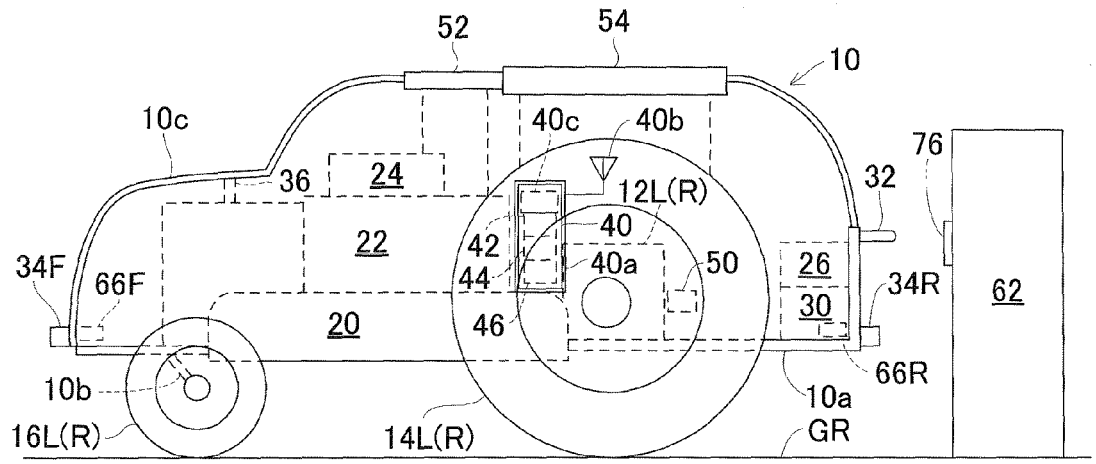
FIG. 1 is an overall schematic view of a control apparatus for an autonomous operating vehicle according to an embodiment of the invention.
Figure 2:
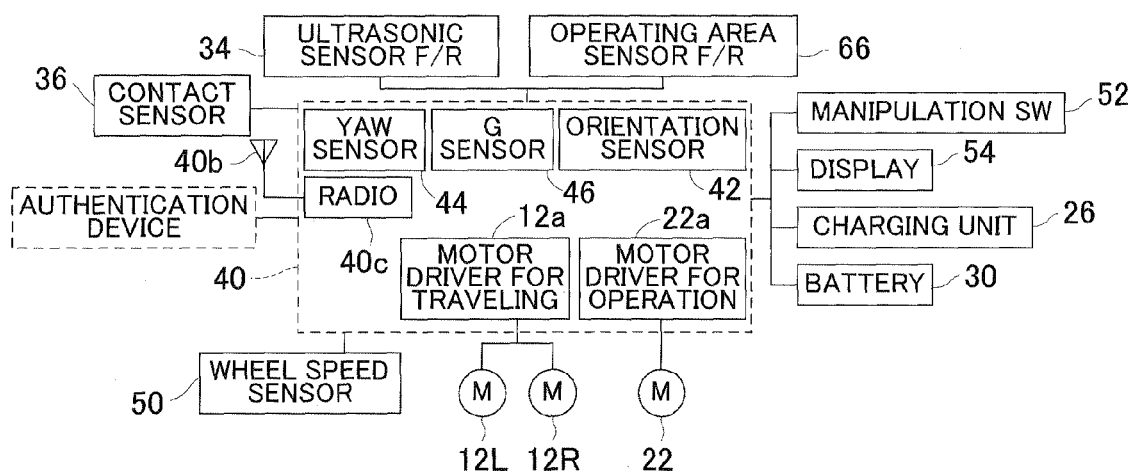
FIG. 2 is a block diagram showing input and output of sensors, an electronic control unit (ECU), electric motors (prime movers), etc., mounted on the vehicle shown in FIG. 1.
Figure 3:
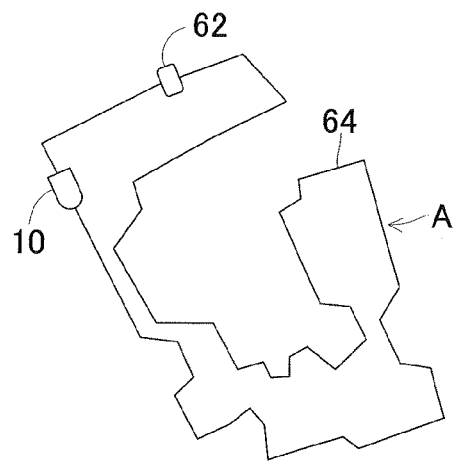
FIG. 3 is a plan view showing a travel-scheduled area where the vehicle of FIG. 1 is to be traveled.
Figure 4:
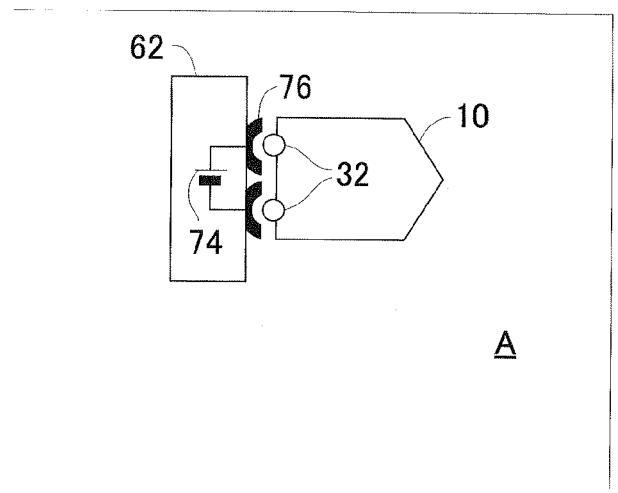
FIG. 4 is an explanatory view showing charging operation at a charge station (ST) shown in FIG. 1.
Figure 5:
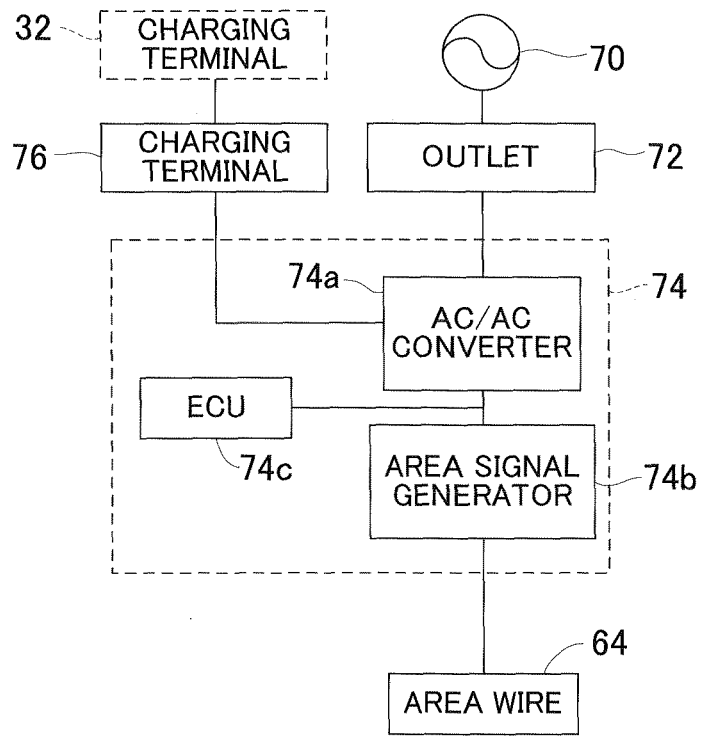
FIG. 5 is a block diagram showing the configuration of the charge ST shown in FIG. 4.
Figure 6:
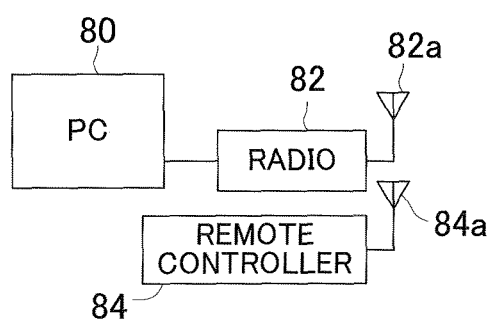
FIG. 6 is a block diagram showing the configuration of manipulation equipment used by an operator for the vehicle shown in FIG. 1.
Figure 7:
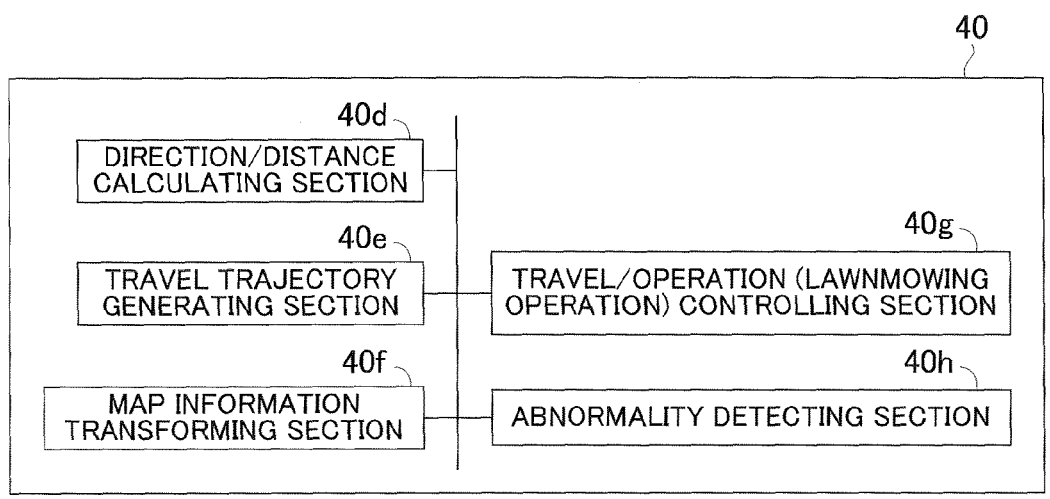
FIG. 7 is a block diagram functionally showing the operation of the apparatus (ECU) shown in FIG. 2.

FIG. 1 is an overall schematic view of a control apparatus for an autonomous operating vehicle according to an embodiment of the invention, FIG. 2 is a block diagram showing input and output of sensors, an electronic control unit (ECU), electric motors (prime movers), etc., mounted on the vehicle, FIG. 3 is a plan view showing a travel-scheduled area where the vehicle of FIG. 1 is to be traveled, FIG. 4 is an explanatory view showing charging operation at a charge station (ST) shown in FIG. 1, FIG. 5 is a block diagram showing the configuration of the charge ST shown in FIG. 4, FIG. 6 is a block diagram showing the configuration of manipulation equipment used by an operator for the vehicle shown in FIG. 1 and FIG. 7 is a block diagram functionally showing the operation of the apparatus (ECU) shown in FIG. 2.

In FIG. 1, symbol 10 indicates an autonomous operating vehicle. As shown in FIGS. 1 and 2, the vehicle 10 is installed with electric motors (prime movers) 12R, 12L for traveling.

The motors 12R, 12L are connected to right and left driven wheels 14R, 14L (only the left side shown) attached on the rear side of a chassis 10a of the vehicle 10 and rotates the driven wheels 14R, 14L in the normal (forward traveling) direction or reverse (backward traveling) direction independently of each other.

Right and left free wheels 16R, 16L (only the left side shown) are attached on the front side of the chassis 10a of the vehicle 10 through a stay 10b. Blades (rotary blades; operating machine) 20 for mowing lawn are attached in the center or thereabout of the chassis 10a.

The blades 20 are connected to an electric motor 22 for operation to be rotated thereby, and also connected to a blade height adjustment mechanism 24 that can be manually operated by an operator (user).

The blade height adjustment mechanism 24 is equipped with screws (not shown) to be manually turned by the operator for adjusting the height of the blades 20 from a contact ground GR. The chassis 10a is attached with a body frame 10c that covers the motors 12, 22, blades 20 and the like.

A charging unit (including an AC/DC converter) 26 and a battery 30 are accommodated at the rear of the vehicle 10 and two charging terminals 32 (later shown in FIG. 4) are attached to the frame 10c to protrude backward.

The terminals 32 are connected to the charging unit 26 and the charging unit 26 is connected to the battery 30 through wiring (not shown). The battery 30 is connected to the motors 12, 22 through wiring (not shown).

Thus the vehicle 10 comprises a four-wheel, unmanned, electric lawn-mower vehicle that is, for instance, about 500 millimeters long, 300 millimeters wide and 300 millimeters high and configured to travel within a travel-scheduled area (operating area) A shown in FIG. 3.

Returning to the explanation on FIG. 1, the front and rear ends of the vehicle 10 are attached with ultrasonic sensors 34F, 34R for detecting an obstacle and the frame 10c is attached with a contact sensor 36. When the frame 10c comes off from the chassis 10a upon having contact with an obstacle and such, the contact sensor 36 outputs an ON signal.

An electronic control unit (ECU) 40 is installed in the center or thereabout of the vehicle 10, more specifically, on a printed-circuit board housed in an ECU housing box 40a. The ECU 40 includes a microcomputer having a CPU, ROM, RAM, I/Os, etc.

An orientation sensor 42 is installed on the board in the ECU housing box 40a in the vicinity of the ECU 40 and generates an output or signal indicative of the primary reference direction on the earth, i.e., the north. The orientation sensor 42 comprises a triaxial geomagnetic sensor having outputs mx, my and mz in directions of three axes x, y and z. In FIG. 3, x indicates a traveling direction of the vehicle 10, y a sideways direction perpendicular to the direction of x, and $\bar{z}$ a gravitational direction (direction penetrating the plane of paper) perpendicular to the directions of x and y.

The board in the ECU housing box 40a is also installed near the orientation sensor 42 with a Yaw sensor (angular velocity sensor) 44 that (detects and) produces an output or signal indicative of angular velocity (yaw rate) generated about the z-axis in the center of gravity of the vehicle 10 and with a G sensor (acceleration sensor) 46 that (detects and) produces an output or signal indicative of the longitudinal (traveling) direction acceleration G acting on the vehicle 10.

A wheel speed sensor 50 is installed near the driven wheel 14 to (detect and) produce an output or signal representing wheel speed thereof. A manipulation switch (emergency stop switch) 52 is disposed in the vehicle 10 to be manipulatable by the operator, so that the vehicle 10 is stopped traveling when the switch 52 is turned ON by the operator.

The outputs of the foregoing ultrasonic sensors 34, contact sensor 36, orientation sensor 42, Yaw sensor 44, G sensor 46, wheel speed sensor 50 and manipulation switch 52 are sent to the ECU 40.

The upper surface of the frame 10c of the vehicle 10 is widely cut away and a display 54 is installed therein. The display 54 is connected to the ECU 40 to show an operation mode, etc., in response to a command sent from the ECU 40.

A receiving antenna 40b is attached to the ECU housing box 40a and a radio 40c connected to the antenna 40b is installed in the ECU housing box 40a.

The explanation on the travel-scheduled area A shown in FIG. 3 will be made. As shown, the travel-scheduled area A has a shape as illustrated and a charge station (ST) 62 is arranged therein. An area wire (electric wire) 64 is laid (embedded) along a border of the travel-scheduled area A and operating area sensors 66F, 66R are installed at the front and rear of the vehicle 10, as shown in FIG. 1.

The operating area sensors 66 comprise magnetic sensors and produce outputs or signals indicative of magnetic field which is to be generated at the area wire 64 upon the supply of alternating current, as explained later. The outputs of the operating area sensors 66 are also sent to the ECU 40.

As mentioned, the charge ST 62 is provided in the travel-scheduled area A so that, as shown in FIG. 4, the vehicle 10 can be stopped and connected to the charge ST 62 through the charging terminals 32 to be charged thereby. As shown in FIG. 5, the charge ST 62 is equipped with a charging device 74 connected to the commercial power source 70 through an electric outlet 72.

The charging device 74 has an AC/AC converter 74a, an area signal generator 74b supplying alternating current to the area wire 64 to generate the magnetic field (area signal), and an electronic control unit (ECU) 74c controlling their operation, and is connectable to the charging terminals 32 of the vehicle 10 through charging terminals 76.

Specifically, the voltage of alternating current coming from the commercial power source 70 through the outlet 72 is appropriately stepped down by the AC/AC converter 74a and, when the vehicle 10 is connected to the charge ST 62 through the charging terminals 32 and 76, the alternating current is supplied to the vehicle 10 and stored in the battery 30 through the charging unit 26.

Manipulation equipment to be used by the operator for manipulating the vehicle 10 includes a personal computer 80, a radio 82 connected thereto and a remote controller 84, as shown in FIG. 6. The radio 82 and remote controller 84 have transmitting antennas 82a, 84a, respectively, so that they can send operation commands to the ECU 40 through the receiving antenna 40b and radio 40c in the vehicle 10.

Note that the ECU 40 is made connectable with an antitheft authentication device or the like.

As shown in FIG. 7, the ECU 40 has an direction and distance calculating section 40d that calculates a traveling direction in which the vehicle 10 travels based on the output of the Yaw sensor 44 and calculates a traveled distance of the vehicle 10 based on the output of the wheel speed sensor 50; a travel trajectory generating section 40e that drives the motors 12 through a motor driver 12a based on the calculated traveling direction so that the vehicle 10 is traveled around from a predetermined start point along the border of the travel-scheduled area A in accordance with the output of the operating area sensors (magnetic sensors) 66 and during the round travel, sequentially records the calculated traveling directions and traveled distances on a bitmap, defining the traveling (operation) area and comprising a plurality of divided bits, to generate a travel trajectory of the vehicle 10 with respect to the border of the travel-scheduled area A; a map information transforming section 40f that transforms the generated travel trajectory to map information; and a travel and operation (lawnmowing operation) controlling section 40g that determines a position of the vehicle 10 using bits on the transformed map information and controls the vehicle 10 to, as traveling straight, perform the operation using the blades (operating machine) 20 through a motor driver 22a based on the calculated traveling direction and traveled distance and the determined position, utilizing the primary reference direction obtained from the output of the orientation sensor (geomagnetic sensor) 42 as a reference.

The ECU 40 further has an abnormality detecting section 40h that stops the vehicle 10 traveling when it detects an abnormality based on the outputs of the ultrasonic sensors 34 and contact sensor 36 or when the manipulation switch 52 is turned ON.

Figure 8:
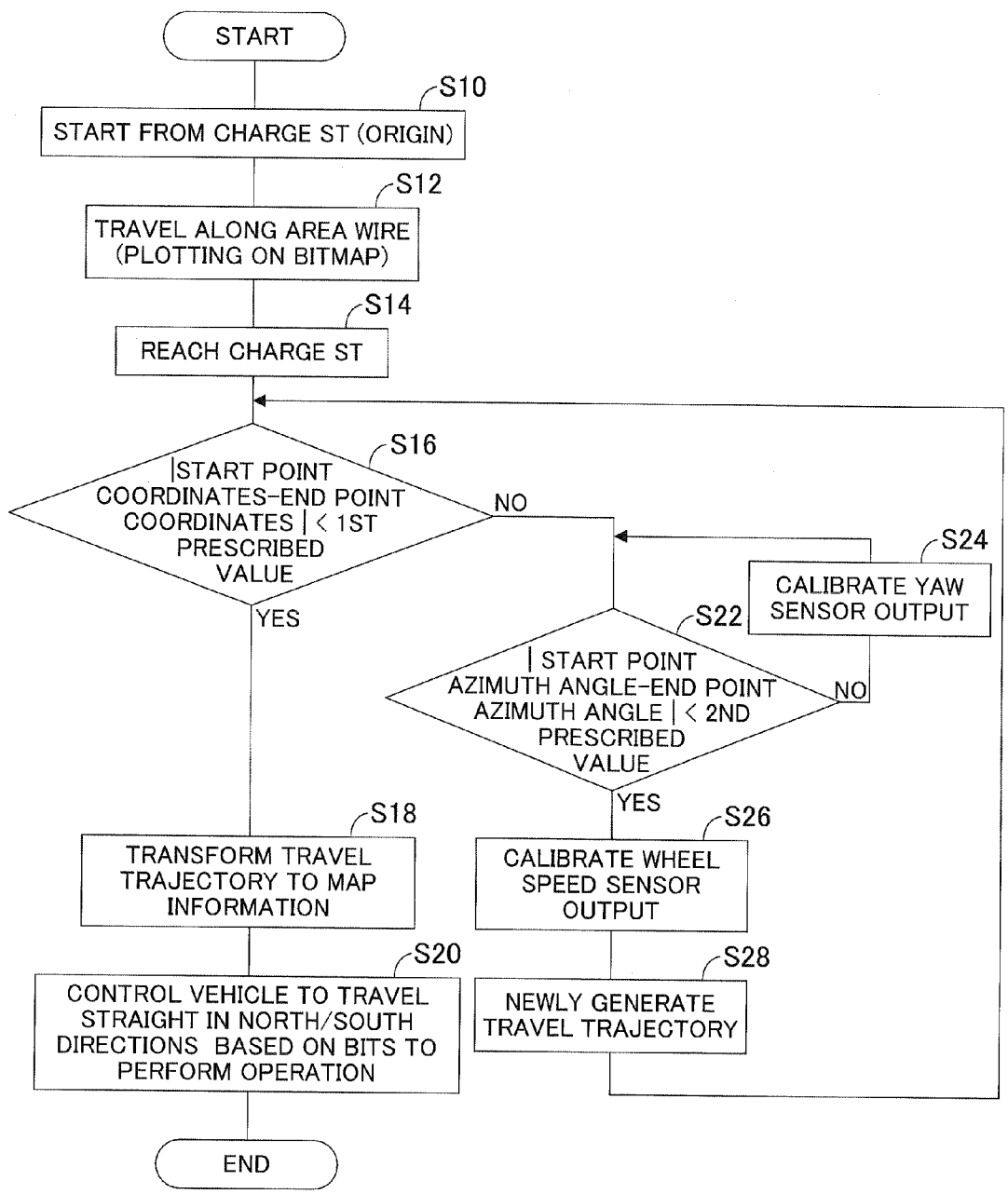
FIG. 8 is a flowchart showing the operation of the apparatus shown in FIG. 1.

FIG. 8 is a flowchart showing the foregoing operation of the ECU 40.

The program begins at S10, in which the vehicle 10 is started from the charge ST 62 (predetermined start point) and proceeds to S12, in which the motors 12 are driven based on the traveling direction calculated from the outputs of the Yaw sensor 44 and wheel speed sensor 50 to travel the vehicle 10 along the area wire 64, i.e., the border of the travel-scheduled area A, in accordance with the outputs of the operating area sensors 66. Then the program proceeds to S14, in which the vehicle 10 is traveled around until reaching the charge ST 62.

Figure 9:
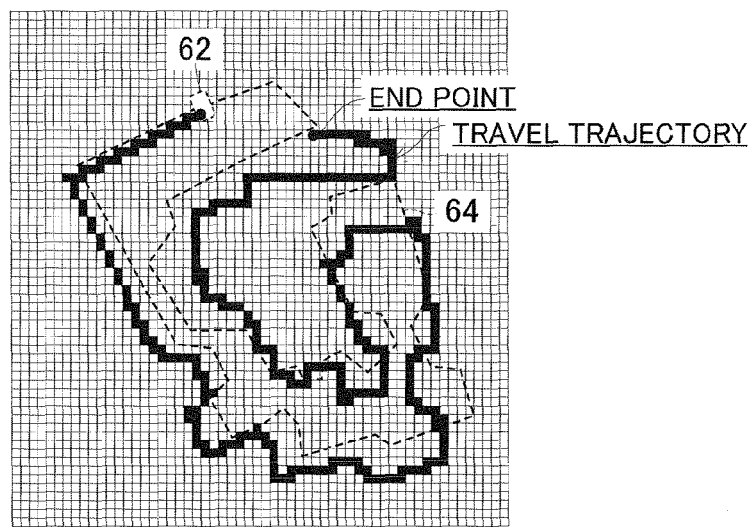
FIG. 9 is an explanatory view showing an example of travel trajectory generated through the processing of FIG. 8.

During the round travel in S10 to S14 the traveling direction and traveled distance calculated based on the outputs of the Yaw sensor 44 and wheel speed sensor 50 are sequentially plotted and recorded on the bitmap, comprising a plurality of divided bits, to generate the travel trajectory with respect to the border of the travel-scheduled area A, as shown in FIG. 9.

In the bitmap shown in FIG. 9, a unit area of each bit is set, for instance, to 300 millimeters×300 millimeters based on the width of the operation performed through the blades 20. The unit area may be set through the manipulation equipment by the operator.

Next the program proceeds to S16, in which an absolute value of a difference between the coordinates (coordinates' position) of the end point at the time when the round travel is finished and that of the start point (charge ST 62), i.e., a distance between the start point and end point is calculated, and it is determined whether the result is less than a first prescribed value.

When uneven parts and slopes exist on the travel trajectory in the travel-scheduled area A or when a friction coefficient of the ground surface is decreased due to rain or the like so that the vehicle 10 is slipped, it may cause a position difference between the start point and end point, as illustrated in FIG. 9.

Figure 10:
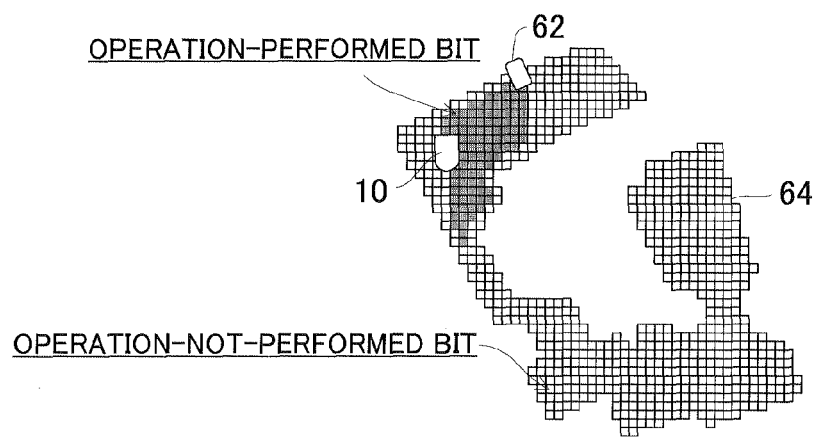
FIG. 10 is an explanatory view showing map information transformed from the travel trajectory.

When the result in S16 is affirmative, i.e., when it is discriminated that the distance does not exceed the first prescribed value, it means that there is no position difference between the start point and end point, and the program proceeds to S18, in which the travel trajectory generated in the processing of S10 to S14 is transformed to the map information. As shown in FIG. 10, since the travel trajectory is indicated on the bitmap, the map information is also composed of the bitmap.

Figure 11:
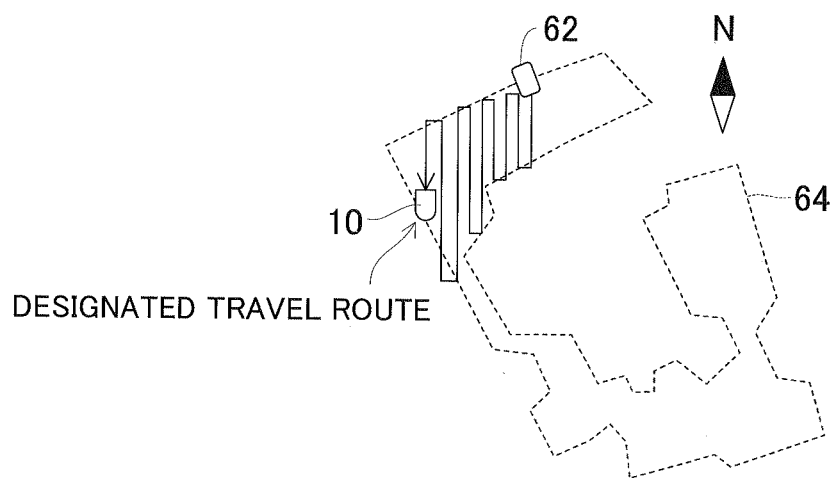
FIG. 11 is an explanatory view showing a condition where, as the vehicle is traveled straight, the operation is performed through an operating machine in the processing of FIG. 8.

Next the program proceeds to S20, in which in the traveling (operating) area A defined by the map information, it is determined for each bit whether the operation has been done, i.e., it is determined whether the position of the vehicle 10 is determined or detected using the bits; and the vehicle 10 is controlled to, as traveling straight as shown in FIG. 11, perform the operation using the blades (operating machine) 20 based on the traveling direction and traveled distance (calculated by the direction and distance calculating section 40d) and the determined position (detected using the bits), utilizing the primary reference direction as a reference.

It should be noted that the operation could be discriminated to have been done for each bit by repeating the travel appropriate times in each bit.

As illustrated, since the primary reference direction from the output of the orientation sensor (geomagnetic sensor) 42 is the north, the vehicle 10 is controlled to travel straight in the north-south directions in the travel-scheduled area A.

On the other hand, when the result in S16 is negative, i.e., when it is discriminated that the distance between the end point at the time when the round travel is finished and the start point exceeds the first prescribed value, the program proceeds to S22 and on, in which the sensor output is calibrated or corrected so that the travel trajectory can be newly generated. More precisely, when the distance exceeds the first prescribed value so that the result in S16 is negative, the program proceeds to S22, in which it is determined whether (an absolute value of) an azimuth angle difference between the end point at the time when the round travel is finished and the start point exceeds a second prescribed value.

When the result in S22 is negative, i.e., when the azimuth angle difference is determined to exceed the second prescribed value, the program proceeds to S24, in which the output of the Yaw sensor 44 is calibrated. The calibration is made by correcting the center value of the Yaw sensor 44 outputs.

When the result in S22 is affirmative, i.e., when it is discriminated that the azimuth angle difference does not exceed the second prescribed value, the program proceeds to S26, in which the output of the wheel speed sensor 50 is calibrated.

Next the program proceeds to S28, in which based on the calibrated output of the Yaw sensor 44 or wheel speed sensor 50, the vehicle 10 is again traveled around and the travel trajectory is newly generated, whereafter the program returns to S16. Therefore, the travel trajectory is transformed to the map information only when the difference between the end point at the time when the round travel is finished and the start point does not exceed the first prescribed value.

Figure 12:
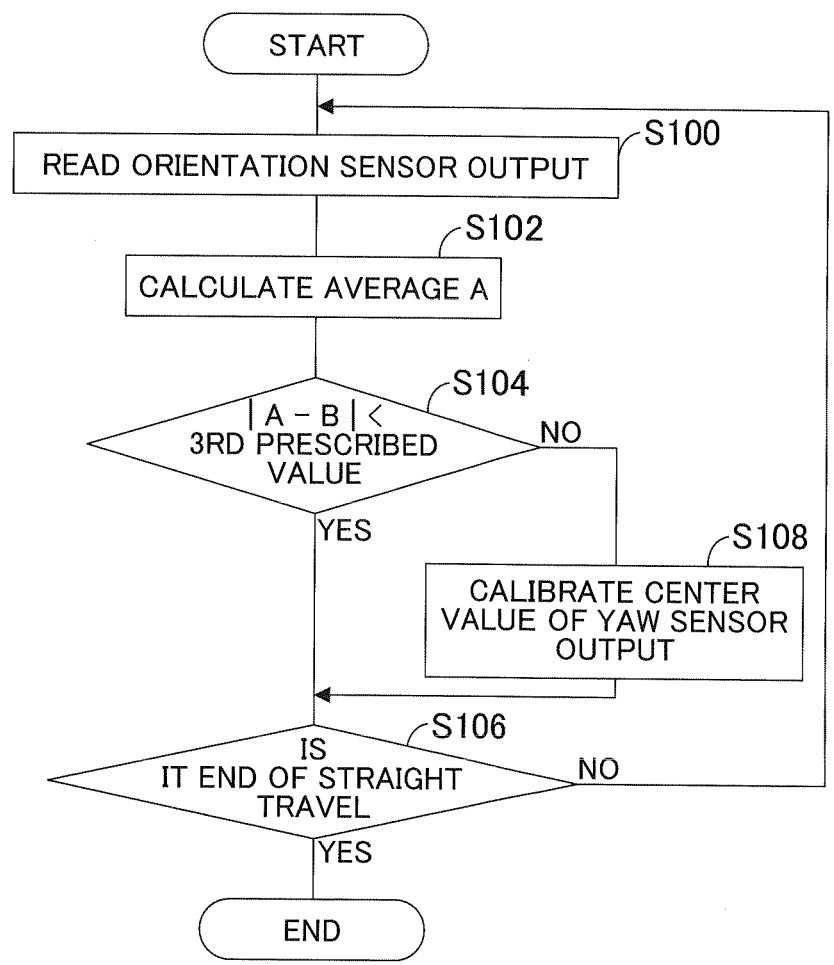
FIG. 12 is a flowchart showing the operation of the apparatus shown in FIG. 1, which is conducted concurrently with straight travel control in FIG. 8.

FIG. 12 is a flowchart showing the operation of the ECU 40 to be conducted concurrently with the straight travel control in S20 of the FIG. 8 flowchart.

In S100, the outputs of the orientation sensor 42 are read. Then the program proceeds to S102, in which an average A of the sensor outputs is calculated and to S104, in which it is determined whether an absolute value of a difference between the average A and a value B is less than a third prescribed value, i.e., whether a change amount of the output of the orientation sensor 42 during the straight travel is less than the third prescribed value. The value B indicates an output of the orientation sensor 42 at the time when the vehicle 10 is started to travel around.

When the result in S104 is affirmative, i.e., when the change amount is determined to be less than the third prescribed value, since it means that the vehicle 10 is traveled straight, the program proceeds to S106, in which it is determined whether the straight travel is to be finished. As long as the result in S106 is negative, the program returns to S100.

When the result in S104 is negative, i.e., when the change amount is determined to exceed the third prescribed value, the program proceeds to S108, in which the output of the Yaw sensor 44, more exactly the center value thereof, is calibrated and the program proceeds to S106.

Figure 13:
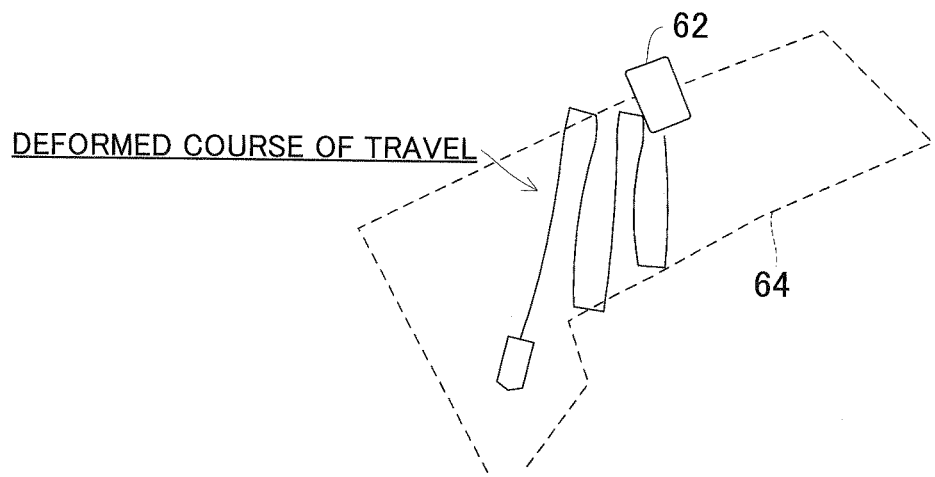
FIG. 13 is an explanatory view showing a condition where a course of travel of the vehicle is deformed for some reason when the vehicle is traveled straight in the processing of FIG. 8.
Figure 14:
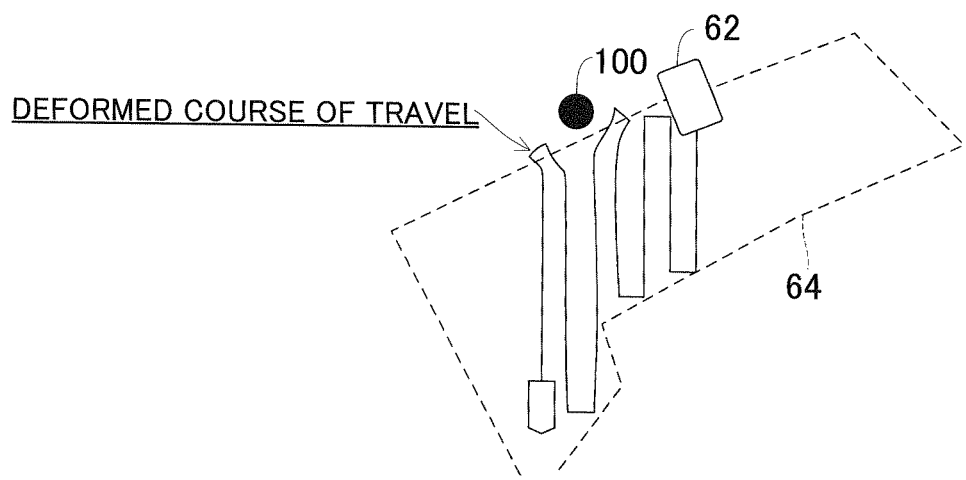
FIG. 14 is an explanatory view similar to FIG. 13, but showing a condition where a course of travel of the vehicle is deformed because an output of an orientation sensor is distorted due to the influence of a magnetic material such as a guardrail in the travel-scheduled area, when the vehicle is traveled straight in the processing of FIG. 8.

Specifically, in this case, a course of travel of the vehicle 10 is deformed for some reason as shown in FIG. 13 or the output of the orientation sensor 42 is distorted due to the influence of a magnetic material 100 such as a guardrail or the like in the travel-scheduled area A. Therefore, the output of the Yaw sensor 44 is calibrated.

In other words, even when the output of the orientation sensor 42 is unreliable, since not the output of the orientation sensor 42 but the output of the Yaw sensor 44 is calibrated, it becomes possible to avoid being affected by the fluctuation in the output of the orientation sensor 42.

As stated above, the embodiment is configured to have an apparatus and method for controlling an autonomous operating vehicle (10) having a prime mover (electric motor 12), a driven wheel (14) connected to the prime mover, an operating machine (blades 20), and a magnetic sensor (operating area sensor 66) adapted to produce an output indicative of magnetic field generated at an electric wire (area wire 64) laid along a border of a travel-scheduled area (A), the vehicle being driven by the prime mover to autonomously travel in the travel-scheduled area defined by the border detected based on the output of the magnetic sensor, while performing operation using the operating machine, comprising: a geomagnetic sensor (orientation sensor 42) adapted to produce an output indicative of geomagnetism acting in the travel-scheduled area; an angular velocity sensor (Yaw sensor 44) adapted to produce an output indicative of angular velocity generated about a vertical axis in center of gravity of the vehicle; a wheel speed sensor (50) adapted to produce an output indicative of a speed of the driven wheel of the vehicle; a direction and distance calculator (ECU 40, direction and distance calculating section 40d) adapted to calculate a traveling direction based on the output of the angular velocity sensor and a traveled distance based on the output of the wheel speed sensor; a travel trajectory generator (ECU 40, travel trajectory generating section 40e, S10 to S14) adapted to drive the prime mover based on the calculated traveling direction so that the vehicle is traveled around from a predetermined start point (charge ST 62) along the border of the travel-scheduled area in accordance with the output of the magnetic sensor and during the vehicle's round travel, to sequentially record the calculated traveling directions and the calculated traveled distances on a bitmap, defining the travel-scheduled area and comprising a plurality of divided bits, to generate a travel trajectory with respect to the border of the travel-scheduled area; a map information transformer (ECU 40, map information transforming section 40f, S16, S18, S22 to S28) adapted to transform the generated travel trajectory to map information composed of the bitmap; and a travel and operation controller (ECU 40, travel and operation controlling section 40g, S20) adapted to determine a position of the vehicle using the bits of the bitmap of the transformed map information, and control the vehicle to, as traveling straight, perform the operation using the operating machine based on the calculated traveling direction, the calculated traveled distance and the determined position, utilizing a primary reference direction obtained from the output of the geomagnetic sensor as a reference.

With this, it becomes possible to detect the position (absolute position) of the vehicle 10 in the traveling (operating) area A with the simple structure, thereby enabling to set the appropriate travel route. In addition, it makes possible to shorten the operating time and achieve the fine trace of the (lawnmowing) operation, thereby enhancing the operation performance.

In the apparatus, the map information transformer determines whether a distance between an end point at time when the round travel is finished and the predetermined start point exceeds a first prescribed value (S16), and newly generates the travel trajectory when the distance is determined to exceed the first prescribed value (S28), while transforming the travel trajectory to the map information when the distance is determined not to exceed the first prescribed value (S18). With this, it becomes possible to properly obtain the map information for the travel-scheduled area A and the accurate position of the vehicle 10 in the travel-scheduled area A can be detected, accordingly.

In the apparatus, the map information transformer determines whether an azimuth difference between the end point at the time when the round travel is finished and the predetermined start point exceeds a second prescribed value when the distance is determined to exceed the first prescribed value (S16, S22), and calibrates the output of the angular velocity sensor when the azimuth difference is determined to exceed the second prescribed value (S24). With this, even when an error occurs in the calculated traveling direction due to uneven parts, slopes or slippery parts in the travel-scheduled area A, the traveling direction can be corrected by calibrating the sensor output. Therefore, it becomes possible to properly obtain the map information for the travel-scheduled area A and the accurate position of the vehicle 10 in the travel-scheduled area A can be detected, accordingly.

In the apparatus, the map information transformer determines whether an azimuth angle difference between the end point at the time when the round travel is finished and the predetermined start point exceeds a second prescribed value when the distance is determined to exceed the first prescribed value (S16, S22), and calibrates the output of the wheel speed sensor when the azimuth angle difference is determined not to exceed the second prescribed value (S28). With this, similarly, even when an error occurs in the calculated traveled distance due to uneven parts, slopes or slippery parts in the travel-scheduled area A, the traveled distance can be corrected by calibrating the sensor output. Therefore, it becomes possible to properly obtain the map information for the travel-scheduled area A and the accurate position of the vehicle 10 in the travel-scheduled area A can be detected, accordingly.

In the apparatus, the travel and operation controller determines whether a change in the output of the geomagnetic sensor during the vehicle's straight travel is less than a third prescribed value (S100 to S104), and determines that the vehicle is traveled straight when the change is determined to be less than the third prescribed value (S106). With this, it becomes possible to further enhance the operation performance.

In the apparatus, the travel and operation controller calibrates the output of the angular velocity sensor when the change is determined to exceed the third prescribed value (S108). In other words, even when the output of the orientation sensor 42 is unreliable because, for instance, the magnetic material such as a guardrail exists in the travel-scheduled area A, since not the output of the orientation sensor 42 but the output of the Yaw sensor 44 is calibrated, it becomes possible to avoid being affected by the fluctuation in the output of the orientation sensor 42.

In the apparatus, a unit area of the bit of the bitmap is set based on width of the operation performed through the operating machine (blades 20). With this, it becomes possible to accurately detect the position of the vehicle 10 and achieve the further fine trace of the (lawnmowing) operation, thereby further enhancing the operation performance.

It should be noted that, in the foregoing, although the motor 12 is applied as the prime mover, it may be an internal combustion engine or another prime mover instead. Also, the blades 20 for mowing lawn are exemplified as the operating machine, but it should not be limited thereto.

Japanese Patent Application No. 2010-222641, filed on Sep. 30, 2010 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an autonomous operating vehicle having a center of gravity, a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while using the operating machine, the apparatus comprising:

a geomagnetic sensor adapted to produce an output indicative of geomagnetism acting in the travel-scheduled area;

an angular velocity sensor adapted to produce an output indicative of angular velocity generated about a vertical axis passing through the center of gravity of the vehicle;

a wheel speed sensor adapted to produce an output indicative of a speed of the driven wheel of the vehicle;

a direction and distance calculator adapted to calculate a traveling direction based on the output of the angular velocity sensor and a distance traveled based on the output of the wheel speed sensor;

a travel path generator adapted to drive the prime mover based on the calculated traveling direction so that the vehicle is guided around from a predetermined start point along the border of the travel-scheduled area in accordance with the output of the magnetic sensor, and to sequentially record the calculated traveling directions and the calculated distances traveled on a bitmap, during the vehicle's travel to an end point, the bit map defining the travel-scheduled area and comprising a plurality of divided discrete areas, so as to generate a travel path with respect to the border of the travel-scheduled area;

a map information transformer adapted to transform the generated travel path to map information composed of the bitmap; and a travel and operation controller adapted to determine a position of the vehicle using the discrete areas from the bitmap of the transformed map information, and control the vehicle, while traveling in straight lines, to perform the operation using the operating machine based on the calculated traveling direction, the calculated distance traveled and the determined position, utilizing a primary reference direction obtained from the output of the geomagnetic sensor as a reference;

wherein the map information transformer determines whether a distance between the end point at a time when the travel around the border of the travel-scheduled area is finished and the predetermined start point exceeds a first prescribed value, and newly generates the travel path when the distance is determined to exceed the first prescribed value, while transforming the travel trajectory to the map information when the distance is determined not to exceed the first prescribed value.

2. The apparatus according to claim 1, wherein the map information transformer determines whether traveling angle difference between the end point at the time when the travel around the border is finished and the predetermined start point exceeds a second prescribed value when the distance is determined to exceed the first prescribed value, and calibrates the output of the angular velocity sensor when the traveling angle difference is determined to exceed the second prescribed value.

3. The apparatus according to claim 1, wherein the map information transformer determines whether an angle difference between the end point at the time when the travel around the border is finished and the predetermined start point exceeds a second prescribed value when the distance is determined to exceed the first prescribed value, and calibrates the output of the wheel speed sensor when the angle difference is determined not to exceed the second prescribed value.

4. The apparatus according to claim 1, wherein the travel and operation controller determines whether a change in the output of the geomagnetic sensor during the vehicle's straight travel is less than a third prescribed value, and determines that the vehicle has traveled straight when the change is determined to be less than the third prescribed value.

5. The apparatus according to claim 4, wherein the travel and operation controller calibrates the output of the angular velocity sensor when the change is determined to exceed the third prescribed value.

6. The apparatus according to claim 1, wherein a unit area of each of the discrete areas of the bitmap is set based on width of the operation performed through the operating machine.

7. An apparatus for controlling an autonomous operating vehicle having a center of gravity, a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while using the operating machine, the apparatus comprising:

geomagnetism output producing means for producing an output indicative of geomagnetism acting in the travel-scheduled area;

angular velocity output producing means for producing an output indicative of angular velocity generated about a vertical axis passing through the center of gravity of the vehicle;

wheel speed output producing means for producing an output indicative of a speed of the driven wheel of the vehicle;

traveling direction and distance calculating means for calculating a traveling direction based on the output of the angular velocity output producing means and a distance traveled based on the output of the wheel speed output producing means;

travel path generating means for driving the prime mover based on the calculated traveling direction so that the vehicle is guided around from a predetermined start point along the border of the travel-scheduled area in accordance with the output of the magnetic sensor, and for sequentially recording the calculated traveling directions and the calculated distances traveled on a bitmap, during the vehicle's travel to an end point, the bitmap defining the travel-scheduled area and comprising a plurality of divided discrete areas, to generate a travel path with respect to the border of the travel-scheduled area;

map information transforming means for transforming the generated travel trajectory to map information composed of the bitmap; and travel and operation controlling means for determining a position of the vehicle using the discrete areas from the bitmap of the transformed map information, and for controlling the vehicle, while traveling in straight lines across the travel-scheduled area, to perform the operation using the operating machine based on the calculated traveling direction, the calculated distance traveled and the determined position, utilizing a primary reference direction obtained from the output of the geomagnetic sensor as a reference;

wherein the map information transforming means determines whether a distance between the end point at a time when the travel around the border of the travel-scheduled area is finished and the predetermined start point exceeds a first prescribed value, and newly generates the travel path when the distance is determined to exceed the first prescribed value, while transforming the travel path to the map information when the distance is determined not to exceed the first prescribed value.

8. The apparatus according to claim 7, wherein the map information transforming means determines whether a traveling angle difference between the end point at the time when the travel around the border is finished and the predetermined start point exceeds a second prescribed value when the distance is determined to exceed the first prescribed value, and calibrates the output of the angular velocity output producing means when the traveling angle difference is determined to exceed the second prescribed value.

9. The apparatus according to claim 7, wherein the map information transforming means determines whether an angle difference between the end point at the time when the travel around the border is finished and the predetermined start point exceeds a second prescribed value when the distance is determined to exceed the first prescribed value, and calibrates the output of the wheel speed output producing means when the angle difference is determined not to exceed the second prescribed value.

10. The apparatus according to claim 7, wherein the travel and operation controlling means determines whether a change in the output of the geomagnetic output producing means during the vehicle's straight travel is less than a third prescribed value, and determines that the vehicle has traveled straight when the change is determined to be less than the third prescribed value.

11. The apparatus according to claim 10, wherein the travel and operation controlling means calibrates the output of the angular velocity output producing means when the change is determined to exceed the third prescribed value.

12. The apparatus according to claim 7, wherein a unit area of each of the discrete areas of the bitmap is set based on width of the operation performed through the operating machine.

13. A method for controlling an autonomous operating vehicle having a center of gravity, a prime mover, a driven wheel connected to the prime mover, an operating machine, and a magnetic sensor adapted to produce an output indicative of magnetic field generated at an electric wire laid along a border of a travel-scheduled area, the vehicle being driven by the prime mover to autonomously travel in the travel-scheduled area defined by the border detected based on the output of the magnetic sensor, while using the operating machine, the method comprising the steps of:

obtaining a sensor output indicative of geomagnetism acting in the travel-scheduled area;

obtaining a sensor output indicative of angular velocity generated about a vertical axis passing through the center of gravity of the vehicle;

obtaining a sensor output indicative of a speed of the driven wheel of the vehicle;

calculating a traveling direction based on the sensor output indicative of the angular velocity and a distance traveled based on the sensor output of indicative of the wheel speed;

driving the prime mover based on the calculated traveling direction so that the vehicle is guided around from a predetermined start point along the border of the travel-scheduled area in accordance with the output of the magnetic sensor, and sequentially recording the calculated traveling directions and the calculated distances traveled on a bitmap, during the vehicle's travel to an end point, the bitmap defining the travel-scheduled area and comprising a plurality of divided discrete areas, so as to generate a travel path with respect to the border of the travel-scheduled area;

transforming the generated travel path to map information composed of the bitmap; and determining a position of the vehicle using the discrete areas from the bitmap of the transformed map information, and controlling the vehicle, while in traveling straight lines across the travel-scheduled area, to perform the operation using the operating machine based on the calculated traveling direction, the calculated distance traveled and the determined position, utilizing a primary reference direction obtained from the sensor output of the geomagnetism as a reference;

wherein the step of map information transforming determines whether a distance between the end point at a time when the travel around the border of the travel-scheduled area is finished and the predetermined start point exceeds a first prescribed value, and newly generates the travel path when the distance is determined to exceed the first prescribed value, while transforming the travel path to the map information when the distance is determined not to exceed the first prescribed value.

14. The apparatus according to claim 13, wherein the step of map information transforming determines whether a traveling angle difference between the end point at the time when the travel around the border is finished and the predetermined start point exceeds a second prescribed value when the distance is determined to exceed the first prescribed value, and calibrates the sensor output indicative of the angular velocity when the traveling angle difference is determined to exceed the second prescribed value.

15. The apparatus according to claim 13, wherein the step of map information transforming determines whether an angle difference between the end point at the time when the travel around the border is finished and the predetermined start point exceeds a second prescribed value when the distance is determined to exceed the first prescribed value, and calibrates the sensor output indicative of the wheel speed when the angle difference is determined not to exceed the second prescribed value.

16. The method according to claim 13, wherein the step of operation controlling determines whether a change in the sensor output indicative of the geomagnetism during the vehicle's straight travel is less than a third prescribed value, and determines that the vehicle has traveled straight when the change is determined to be less than the third prescribed value.

17. The method according to claim 16, wherein the step of operation controlling calibrates the sensor output indicative of the angular velocity when the change is determined to exceed the third prescribed value.

18. The method according to claim 13, wherein a unit area of each of the discrete areas of the bitmap is set based on width of the operation performed through the operating machine.

* * * * *